US009760166B2

(12) United States Patent
Ammi et al.

(10) Patent No.: US 9,760,166 B2
(45) Date of Patent: Sep. 12, 2017

(54) HAPTIC SYSTEM FOR ESTABLISHING A CONTACT FREE INTERACTION BETWEEN AT LEAST ONE PART OF A USER'S BODY AND A VIRTUAL ENVIRONMENT

(71) Applicants: CENTRE NATIONAL DE LA RECHERCHE SCIENTIFIQUE, Paris (FR); UNIVERSITE PIERRE ET MARIE CURIE, Paris (FR)

(72) Inventors: Mehdi Ammi, Massy (FR); Nizar Ouarti, Dourdan (FR)

(73) Assignees: CENTRE NATIONAL DE LA RECHERCHE SCIENTIFIQUE, Paris (FR); UNIVERSITE PIERRE ET MARIE CURIE, Paris (FR)

( * ) Notice: Subject to any disclaimer, the term of this patent is extended or adjusted under 35 U.S.C. 154(b) by 0 days.

(21) Appl. No.: 14/652,442

(22) PCT Filed: Dec. 16, 2013

(86) PCT No.: PCT/EP2013/076770
§ 371 (c)(1),
(2) Date: Jun. 15, 2015

(87) PCT Pub. No.: WO2014/095765
PCT Pub. Date: Jun. 26, 2014

(65) Prior Publication Data
US 2016/0187966 A1     Jun. 30, 2016

(30) Foreign Application Priority Data
Dec. 17, 2012   (FR) ..................... 12 62156

(51) Int. Cl.
*G06F 3/01*       (2006.01)
*B05B 1/00*       (2006.01)
(Continued)

(52) U.S. Cl.
CPC .............. *G06F 3/011* (2013.01); *B05B 1/005* (2013.01); *B05B 12/087* (2013.01); *B05B 13/0431* (2013.01); *G06F 3/016* (2013.01)

(58) Field of Classification Search
CPC ....... G06F 3/011; G06F 3/016; B05B 12/124; B05B 12/126; B05B 12/087;
(Continued)

(56) References Cited

U.S. PATENT DOCUMENTS

2003/0117371 A1* 6/2003 Roberts ................... G06F 3/014
345/156
2007/0085820 A1* 4/2007 Suzuki .................... G06F 3/016
345/156
(Continued)

FOREIGN PATENT DOCUMENTS

EP       1 768 011 A1    3/2007
WO    2011/117794 A1    9/2011

OTHER PUBLICATIONS

Takayuki Hoshi et al., "Noncontact Tactile Display Based on Radiation Pressure of Airborne Ultrasound," IEEE Transactions on Haptics, vol. 3, No. 3, Jul.-Sep. 2010, pp. 155-165.
(Continued)

*Primary Examiner* — Sanjiv D Patel
(74) *Attorney, Agent, or Firm* — Baker & Hostetler LLP

(57) ABSTRACT

A haptic system for establishing an interaction between at least one part of the body of a user called stimulation zone and a virtual environment comprises means for estimating the position of the stimulation zone; means for emitting, toward the stimulation zone, at least one flow rate-controlled air jet, the air jet being emitted at a point of emission and its flow rate being determined as a function of the estimated position of the stimulation zone in space and of the characteristics of the virtual environment; a robotized structure controlled so as to move the point of emission of the air jet so that said point of emission remains at a constant distance from the stimulation zone.

18 Claims, 3 Drawing Sheets

(51) Int. Cl.
*B05B 12/08* (2006.01)
*B05B 13/04* (2006.01)

(58) Field of Classification Search
CPC ............ B05B 12/005; H04N 21/44222; H04N 21/4131; H04N 21/47; G05G 9/047; G05G 5/005; G05G 11/00; G05G 5/03; F04D 3/00; F04D 15/0022; F04D 29/566; F04D 1/006; F04D 29/24; F04D 29/445
See application file for complete search history.

(56) References Cited

U.S. PATENT DOCUMENTS

| | | | | |
|---|---|---|---|---|
| 2008/0249718 A1* | 10/2008 | Suzuki | .................... | G06F 3/016 702/41 |
| 2010/0053151 A1* | 3/2010 | Marti | .................... | G06F 3/011 345/419 |
| 2010/0128112 A1* | 5/2010 | Marti | .................... | G06F 3/011 348/51 |
| 2010/0292706 A1* | 11/2010 | Dutson | .................... | G06F 3/016 606/130 |
| 2013/0100008 A1* | 4/2013 | Marti | .................... | G06F 3/011 345/156 |
| 2014/0160082 A1* | 6/2014 | Park | .................... | G06F 3/016 345/175 |

OTHER PUBLICATIONS

Y. Suzuki and M. Kobayashi, "Air Jet Driven Force Feedback in Virtual Reality", IEEE Computer Graphics and Applications, pp. 44-47, 2005. Cited in paragraph [0006]of originally filed specification.

* cited by examiner

HAPTIC SYSTEM FOR ESTABLISHING A CONTACT FREE INTERACTION BETWEEN AT LEAST ONE PART OF A USER'S BODY AND A VIRTUAL ENVIRONMENT

CROSS-REFERENCE TO RELATED APPLICATIONS

This application is a National Stage of International patent application PCT/EP2013/076770, filed on Dec. 16, 2013, which claims priority to foreign French patent application No. FR 1262156, filed on Dec. 17, 2012, the disclosures of which are incorporated by reference in their entirety.

FIELD OF THE INVENTION

The invention relates to a haptic method and system for establishing contact-free interaction between at least one part of the body of a user and a virtual environment and applies to the field of haptic interfaces.

BACKGROUND

The haptic interfaces are systems implementing a set of techniques deriving notably from robotics and computing. These systems make it possible to physically stimulate a user through tactile and kinesthetic and/or thermal perceptions and allow for a better immersion in virtual environments representative or not of real environments.

Thus, the haptic interfaces act on the user by applying to the user forces, vibrations, movements, or changes of temperature making it possible to feel textures, shapes, forces or heats.

By way of example, the CyberTouch (registered trademark) system developed by the company CyberGlove Systems consists in wearing a data glove equipped with vibrators making it possible to stimulate the phalanges and the palm. This type of system has the drawback of being particularly intrusive.

Another example of haptic interface has been proposed in the article by H. Takayuki, T. Masafumi, I. Takayuki and S. Hiroyuki entitled "*Noncontact tactile display based on radiation pressure of airborne ultrasound*", IEEE Transactions on Haptics, vol. 3 no. 3, pp. 155-165, 2010. It is proposed to exploit the pressure of the acoustic radiation generated by ultrasound transcoders in order to stimulate the user. This makes it possible to implement a haptic interface without direct contact with the user. This interface is based on the control of the phase delays of the acoustic waves to produce a focal point. The main drawback with this technology relates to the limit of intensity of the force applied to the user. Another not-inconsiderable drawback is that it can lead to medical risks, particularly in interactions with sensitive regions such as, for example, the head or the face.

Another example is based on the use of a plurality of air jets as presented in the article by Y. Suzuki and M. Kobayashi entitled "*Air jet driven force feedback in virtual reality*", IEEE Computer Graphics and Applications, pages 44-47, 2005. This paper discloses a haptic system consisting of multiple air jets arranged in a matrix and rigid air receivers held by the user. The air jets released through nozzles strike the air receivers and apply forces to the hand of the user. This haptic device allows a user to interact with static or dynamic surfaces. This strategy presents the notable drawback of a limited resolution in terms of force and position. Furthermore, the user has to be provided with at least one effector, that is to say a rigid air receiver for example.

It appears that none of the haptic systems mentioned above make it possible to both dispense with any direct contact with the user while allowing hazard-free access to a great wealth of rendering and perception such as a volume perception, a three-dimensional gestural guidance, etc.

SUMMARY OF THE INVENTION

One aim of the invention is notably to mitigate the abovementioned drawbacks.

To this end, the subjects of the invention are a haptic system for establishing an interaction between at least one part of the body of a user called stimulation zone and a virtual environment. The system comprises means for estimating the position of the stimulation zone, means for emitting, toward the stimulation zone, at least one flow rate-controlled air jet, the air jet being emitted at a point of emission and its flow rate being determined as a function of the estimated position of the stimulation zone in space and of the characteristics of the virtual environment. The system further comprises a robotized structure controlled so as to move the point of emission of the air jet so that said point of emission remains at a constant distance from the stimulation zone.

According to one aspect of the invention, the robotized structure is an articulated robotized arm.

The system comprises, for example, means for modeling and displaying the virtual environment with which the user will interact.

The virtual environment corresponds, for example, to a modeling of a real environment with which the user interacts remotely.

According to one aspect of the invention, the emission means comprise a device of mass flow rate controller type so as to control the flow rate of the air jet.

The emission means comprise, for example, a blowing nozzle, the point of emission of the air jet corresponding to the free end of said nozzle.

The blowing nozzle is, for example, fed by at least two sources of air of different temperatures, said flows being mixed so as to vary the temperature of the air jet at the outlet of the nozzle.

The stimulation zone corresponds, for example, to the zone defined by the intermediate phalanges of the hand of the user.

The blowing nozzle has, for example, an angle of divergence of less than 12.5 degrees so as to obtain stimulate a small area of the stimulation zone.

The distance between the outlet of the blowing nozzle and the stimulation zone of the user is, for example, between 10 and 20 centimeters.

The distance between the outlet of the blowing nozzle and the stimulation zone of the user is, for example, equal to 15 centimeters.

The blowing nozzle has, for example, an angle of divergence of between 12.5 degrees and 22 degrees so as to stimulate an extended area of the stimulation zone.

A flow rate controller is, for example, used so as to vary the flow rate of air feeding the blowing nozzle.

A flow rate sensor is, for example, used so as to obtain an estimation of the emission flow rate at the inlet of the blowing nozzle.

A regulation value is, for example, applied to the flow rate controller so as to obtain a flow rate at the outlet of the blowing nozzle close to the setpoint value Dcons when a difference between the estimated flow rate value and the setpoint Dcons is detected.

The estimation of the flow rate at the inlet of the blowing nozzle is, for example, compared with a setpoint value Dcons using a digital electronic regulator.

The flow rate setpoint value Dcons is, for example, determined by using the following expression:

$$Dcons=F*k$$

in which:

Dcons represents the flow rate setpoint expressed in liters per minute (L/min);

F represents the modulus of the force to be applied to the stimulation zone, in newtons (N), this value being determined using the implementation of a model of interaction with the virtual environment;

k is a constant expressed in L/min*N.

In one embodiment, the haptic system comprises means for spraying water toward the stimulation zone so as to vary the level of humidity of said zone.

The water spraying means are, for example, implemented using an aerosol spray.

BRIEF DESCRIPTION OF THE DRAWINGS

Other features and advantages of the invention will become apparent from the following description given by way of illustration and in a nonlimiting manner, given with respect to the attached drawings in which.

DETAILED DESCRIPTION

Figure 1:
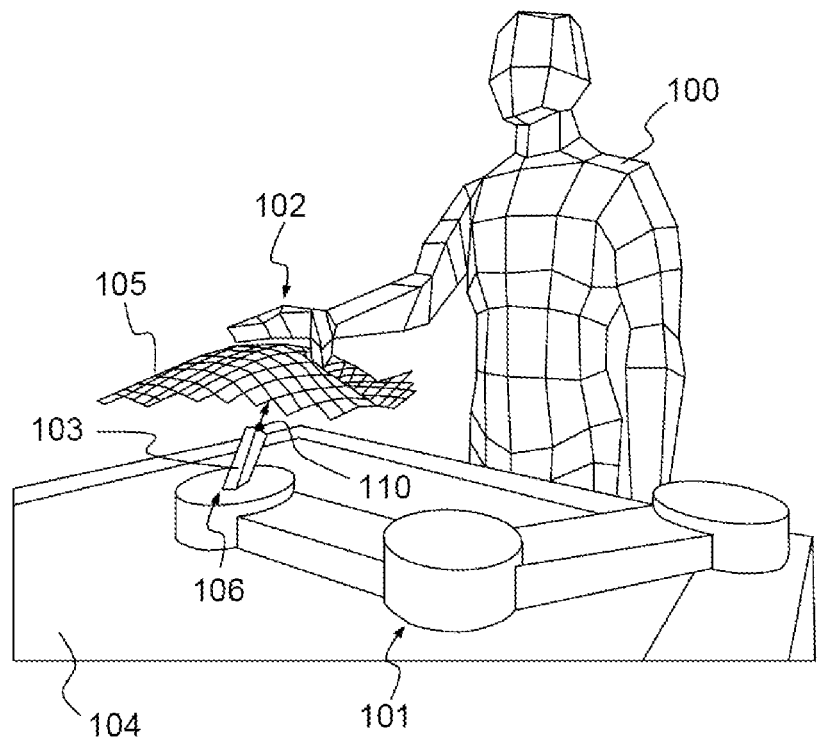
FIG. 1 schematically presents the principle of the haptic system according to the invention.

FIG. 1 schematically presents the principle of the haptic system according to the invention.

This haptic system implements a haptic interface enabling a user 100 to interact with a virtual environment 105. For this, the user 100 uses a part of his or her body hereinafter in this description called "stimulation zone". In this example, the stimulation zone corresponds to a part of the hand 102 of the user. The haptic system can also be adapted to other stimulation zones, such as, for example, the arm or the head.

The haptic system notably comprises a robotized structure. In this example, the robotized system used is an articulated robotized arm 101. The robotized system comprises a particular zone hereinafter in the description called "fixing zone". In this example, the fixing zone 106 corresponds to the end of the robotized arm 101.

Alternatively, other types of robotized systems can be used. By way of example, a system of plotting table type can be used.

The haptic system also comprises a device 103 for emitting at least one air jet. This device 103 is fixed to the robotized structure 101 in a fixing zone 106 and is arranged so that the air jet is directed toward the stimulation zone 102.

The function of the robotized structure is to follow the movements of the stimulation zone by keeping a constant distance between the point of emission of the air jet and said stimulation zone.

The user 100 moves the stimulation zone 102 in a workspace so as to interact with the virtual environment 105. This work zone corresponds, for example, to a three-dimensional space. For the user 100 to intuitively have an idea of the extent of this space, a table 104 onto which the robotized structure is fixed can be used. Thus, in the case where the workspace is three-dimensional, the user will perceive that he or she can move the stimulation zone only within the space defined by the upward extension of the sides of this table 104.

Essentially, the air jet emission flow rate is controlled by taking into account the estimated position of the stimulation zone 102 in the space and the characteristics of the virtual environment 105. Indeed, the estimated position of the stimulation zone 102 in the space corresponds to a position in the space of the virtual environment and therefore makes it possible to determine the type of sensations that the user should feel. By way of example, if the stimulation zone and in contact with a surface of a solid object of the virtual environment, the user will have to feel a strong resistance. Thus, the level of stimulation of the zone 102 is adapted so that the user 100 feels precisely the effect of his or her actions in the virtual environment 105. The flow rate can be controlled by using a device of mass flow rate controller type.

The movement of the point of emission of the air jet is implemented so that it is located at a constant distance from the stimulation zone 102 of the user 100. This allows for an optimal use of the air jet. The stimulation zone is thus positioned at a distance of emission of the air jet so that the variation of the emission flow rate makes it possible to communicate to the user varied touch sensations of different levels, such as, for example, a sensation of contact with a solid, a sensation of friction or a sensation of contact with a flexible material.

The haptic system further comprises means for determining the position of the stimulation zone 102 in the workspace. The estimation of this position then makes it possible to control the movements of the robotized structure 101 so as to keep the point of emission of the air jet at a substantially constant distance from the stimulation zone 102.

According to one aspect of the invention, the virtual environment can be projected onto a screen visible to the user.

This haptic system therefore has the decisive advantage of avoiding any recourse to an intrusive mechanical structure having to be in contact with a part of the body of the user 100. The air jet stimulates the user by producing a sensation of interaction with the virtual environment.

Figure 2:
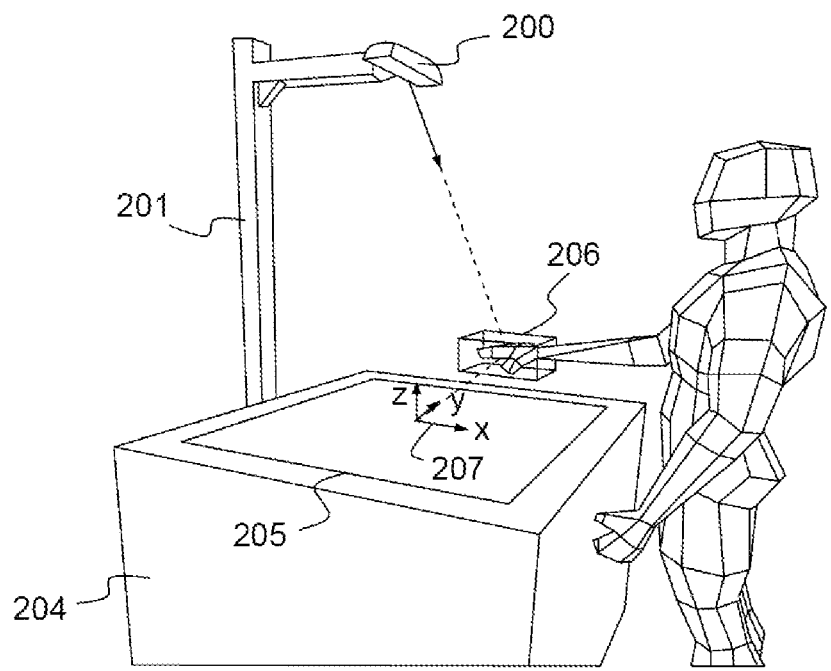
FIG. 2 gives an example of a system making it possible to estimate the position and track the movements of a stimulation zone.

FIG. 2 gives an example of a system making it possible to estimate the position and track the movements of a stimulation zone.

Indeed, in order for the haptic system according to the invention to be able to be implemented, it is essential to be able to locate the position of the stimulation zone 206 and determine its orientation in order to track its movements.

For this, a video sensor can be positioned so as to acquire images of the workspace in which the part of the body of the user corresponding to the stimulation zone moves. This video sensor consists for example of a first RGB (Red Green Blue) type color image sensor making it possible to obtain x and y axis coordinates and a second depth sensor making it possible to obtain an image of depth of the zone to be stimulated.

A support 201, for example fixed to a table 204 delimiting 205 the workspace, can be used to keep the video sensor 200 in a position enabling it to acquire these images. The aim is then to determine the position of a central point of the stimulation zone. This position can for example be expressed in a three-dimensional reference frame 207 that is fixed relative to the table 204. Furthermore, the orientation of the stimulation zone determined.

By way of example, the Kinect (registered trademark) system can be used. This system generates a depth map making it possible to determine the position and the orientation of the stimulation zone on three axes. This information is then used to servocontrol the robotized structure. Other types of sensors can be used, such as, for example, motion sensors coupled with markers positioned on the body of the user close to the stimulation zone, for example on the back of the hand if the stimulation zone is the palm of the hand.

Figure 3:
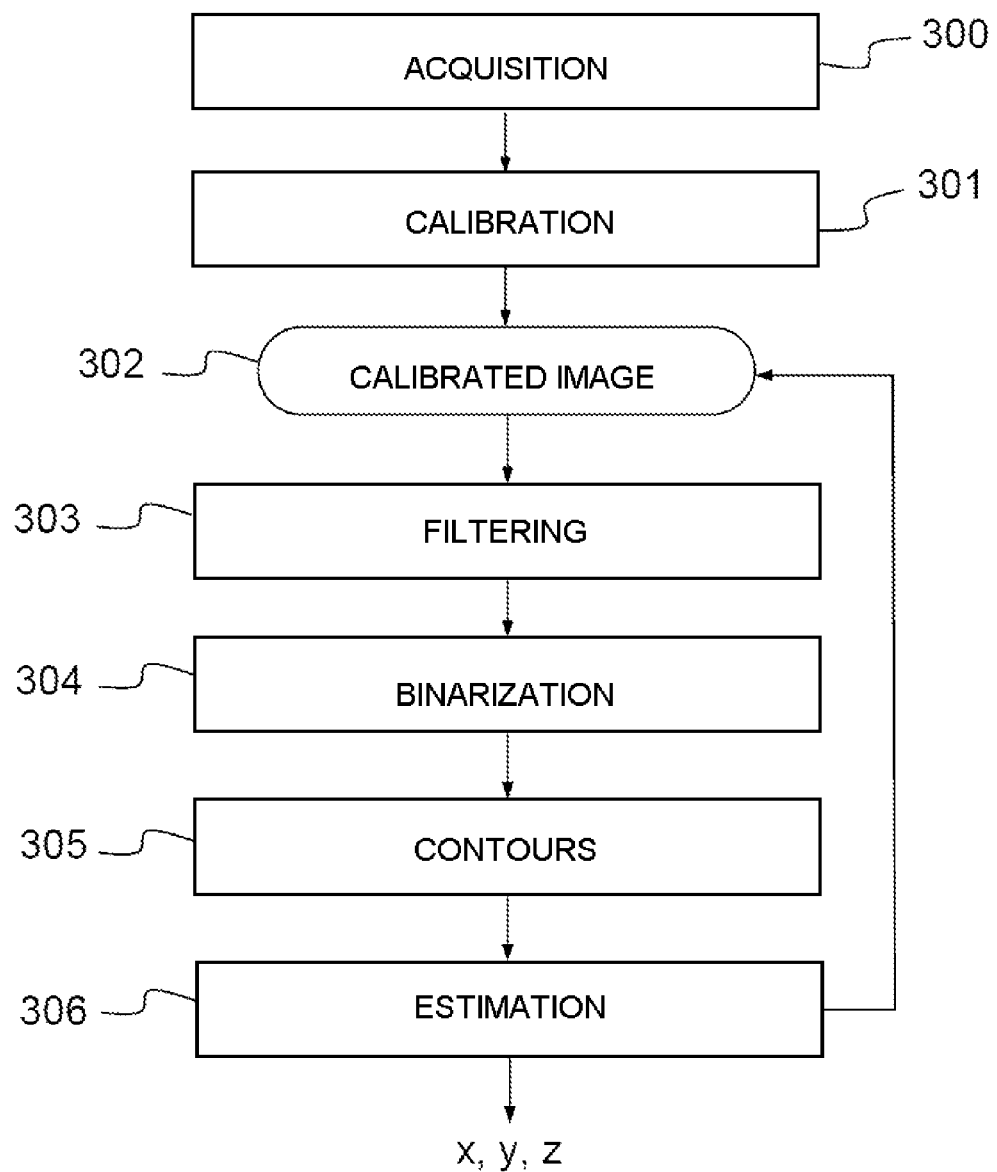
FIG. 3 gives an example of a method making it possible to determine the position and the orientation of the stimulation zone.

FIG. 3 gives an example of a method making it possible to determine the position and the orientation of the stimulation zone.

In this example, it is assumed that the sensor is an RGB-type image sensor and that it generates a succession of RGB images.

The aim of a first step 300 is to acquire an RGB image generated by the sensor. This image can be converted into any format to facilitate its processing. By way of example, it can be converted into the OpenCV format so as to allow the use of this library of functions. The image returned by the RGB image sensor represents the distance of each pixel relative to the position of the camera. These values can be expressed in an arbitrary unit.

It is possible that the RGB image does not take into account the curvature caused by the optics of the sensor. This defect could falsify the distance computations when performed directly on the image. Thus, a second step 301 implements a calibration of the image in order to ensure that the hand is tracked with satisfactory accuracy. This calibration corresponds to a transformation applied to the RGB image. Thus, the application of the step 301 makes it possible to obtain a calibrated image 302 on the basis of the calibrated depth image.

The aim of a third step 303 is to apply a spatial filtering to isolate the part of the body of the user corresponding to the stimulation zone from the rest of the environment. Only the objects located above the robotized structure are kept. This operation can be used also to delimit the processing zone.

A fourth step 304 applies an operation called "binarization" on the basis of the filtered image and makes it possible to identify the areas of the image upon which the attention must be focused for the position estimation.

A fifth step 305 consists in checking to see if one of the objects visible on the binary mask exhibits the characteristics of the part of the body corresponding to the stimulation zone. This step is performed using a conventional contour detection operation.

The aim of a sixth step 306 is to estimate the position of the stimulation zone in the workspace. If the hand is used as stimulation zone, it is possible for example to estimate the position of the end of the phalanges. However, it is possible to plot other parts such as the palm of the hand for example.

A seventh step, not represented, can also be implemented in order to estimate the depth of the stimulation zone. For this, a sensor making it possible to obtain a depth image can be used.

Figure 4:
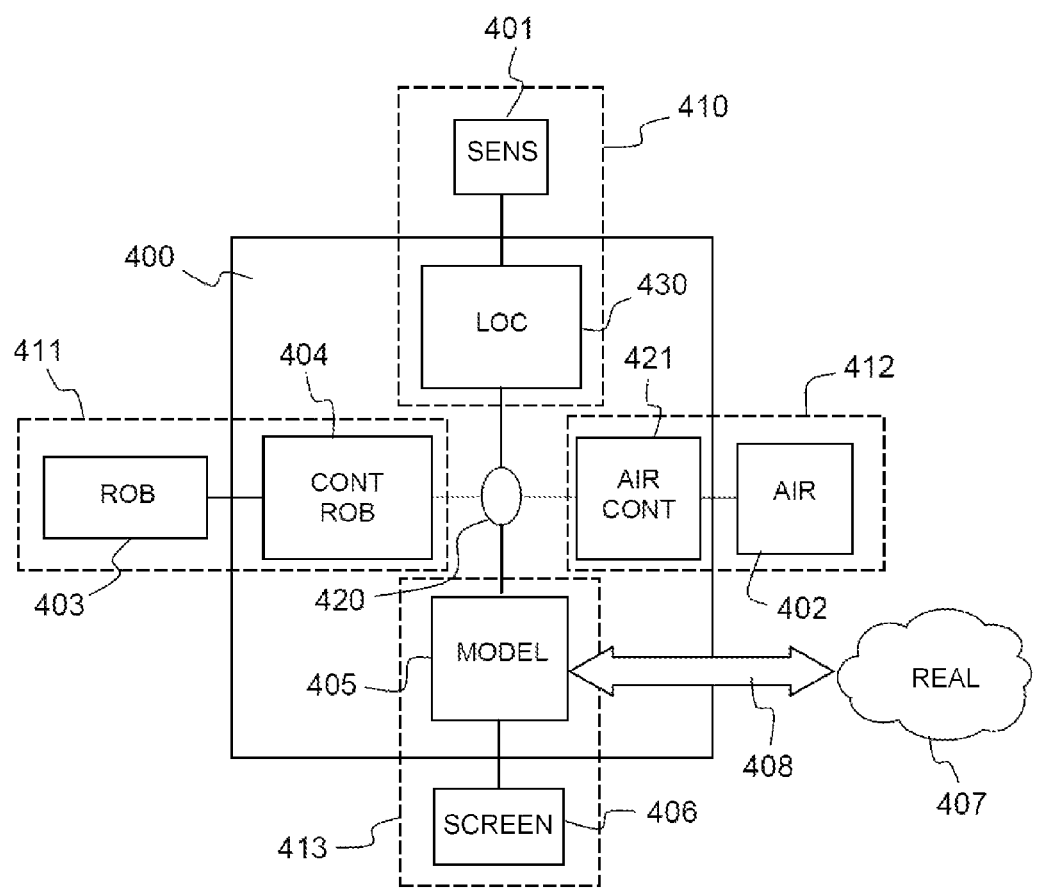
FIG. 4 schematically illustrates the interactions between the different elements that make up the haptic system according to the invention.

FIG. 4 schematically illustrates the interactions between the different elements that make up the haptic system according to the invention.

The haptic system is made up of a set of physical equipment items 401, 402, 403, 406 controlled, for example, by a set of computer resources 400 implemented using a computation processor.

The robotized structure 411 is made up of a robotized device such as a robot arm 403 and control resources 404 implemented for example using a plurality of computer programs.

The system further comprises means 410 making it possible to identify the position of the stimulation zone and track its movements. These means 410 correspond, for example, to an equipment item 401 corresponding to a sensor producing an image of depth of the workspace. This sensor is coupled to a set of resources 430 making it possible to analyze the data that it supplies so as to accurately locate the stimulation zone and track its movements.

The system also comprises air jet emission means 413. These means are for example made up of an emission equipment item 402 corresponding, for example, to a blowing nozzle coupled with a flow rate sensor that is not represented and a set of resources, for example computer resources 421, making it possible to control the air jet emission flow rate.

The haptic system can also comprise means 413 for modeling 403 and displaying 406 the virtual environment with which the user will interact. For example, the virtual environment is modeled 405 then displayed 406 on a screen visible to the user of the haptic system. This virtual environment can be an environment created by a designer. Alternatively, the virtual environment can be a modeling of a real environment 407 with which the user wants to interact remotely. Thus, the modifications made remotely by the user to the real environment 407 are reflected 408 on the modeling 405 of the virtual space displayed on the screen 406. This can be particularly useful for applications of precision surgical operation type performed remotely.

The subsystems 410, 411, 412, 413 interact with one another 420.

The means for emitting at least one air jet represent one of the essential parts of the invention.

It is difficult to obtain a generic mechanical model of the flow of an air jet because of the large number of influencing parameters. Thus, in order to determine a pressure distribution suited to the haptic system, a strategy of trial and error can be envisaged so as to establish a relationship between the injection air flow rate, the pressure and the touch stimulation.

In order to determine the optimal conditions of use, that is to say the conditions that make it possible to obtain the best possible interaction between the user and the virtual environment, it is for example possible to determine a set of three control elements:

- the choice of the blowing nozzle or nozzles, in particular its form is its dimension;
- the air flow rate at the outlet of the blowing nozzle;
- the distance between the outlet of the blowing nozzle and the stimulation zone of the user.

In one embodiment, a nozzle allowing for the emission of a concentrated air jet is chosen so as to obtain a touch stimulation on a small area of the stimulation zone. For this, the choice of shape of the blowing nozzle is a determining factor because there is a direct relationship between said shape and the angle of diffusion of the air jet.

In order to obtain a concentrated emission onto a small area of the stimulation zone, a blowing nozzle with an angle of divergence of less than 12.5 degrees can be used.

Advantageously, this blowing nozzle could be chosen to be of stainless steel with a central hole surrounded by slots so as to generate a concentrated air jet while limiting the sound level during the blowing.

Other types of blowing nozzles with different properties can be implemented by the system according to the invention by notably taking into account the application for which the haptic system is used.

Thus, in order to obtain a stimulation over an extended area of the stimulation zone, a blowing nozzle having an angle of divergence of between 12.5 degrees and 22 degrees can be used.

The blowing nozzle is connected to a compressed air source, for example by a pipe made of flexible plastic material. An air compressor supplying a sufficient pressure, for example equal to 4 bar, can be used.

So as to vary the flow rate of air feeding the nozzle, a flow rate controller is for example used in order to regulate the mass flow rate of gas. A flow rate sensor incorporated in the mass flow rate controller makes it possible to obtain an estimation of the current flow rate at the inlet of the nozzle. This value is compared, using a digital electronic regulator, with a setpoint value Dcons determined in such a way that a stimulation representative of the interaction of the stimulation zone with the virtual environment is produced. If a difference between the estimated flow rate value and the setpoint Dcons is detected, a regulation value applied to the flow rate controller will be modified so as to obtain a flow rate at the outlet of the blowing nozzle close to this setpoint. For this, a regulation algorithm of proportional integral type can for example be used.

The flow rate setpoint value can be determined, for example, by using the following expression:

$$Dcons = F * k$$

in which:
Dcons represents the flow rate setpoint expressed in liters per minute (L/min);
F represents the modulus of the force to be applied to the stimulation zone, in newtons (N), this value being determined using the implementation of a model of interaction with the virtual environment;
k is a constant expressed in L/min*N.

In order to make optimal use of the haptic interface, the choice of the distance between the outlet of the blowing nozzle and the stimulation zone of the user is a determining factor. As mentioned previously, one of the aims of the device is to allow for a contact-free touch stimulation. When a blowing nozzle having an angle of divergence of less than 12.5 degrees is used, the aerodynamics of the air jet dictate a distance less than twenty centimeters for the air jet to remain sufficiently concentrated. For such a nozzle, the distance between the outlet of the blowing nozzle and the stimulation zone of the user has to be between ten and twenty centimeters. Preferentially, a distance of fifteen centimeters can be used. This value is particularly suitable when the stimulation zone corresponds to the zone defined by the intermediate phalanges of the hand, the intermediate phalanges being those which are directly linked to the distal phalanges.

In one embodiment of the invention, the haptic system uses at least one blowing nozzle fed by two sources of air. The air flows emitted by these two sources of air are mixed at different temperatures before being introduced into the nozzle. The mix is controlled so as to vary the temperature of the air jet at the outlet of the nozzle. By way of example, a cold source at ten degrees Celsius can be mixed with a hot source at fifty degrees Celsius. Means for controlling the flow rate are associated with each air source. It is then possible to accurately vary the temperature at the outlet of the blowing nozzle by adapting the flow rate of the two sources. By taking into account the heat losses occurring in the system, it is possible to vary the temperature of the air jet at the outlet of the nozzle in a range from fifteen to forty-five degrees Celsius.

The thermal stimulation can be used in numerous applications. The thermal stimulation can be used to discriminate positive and negative values in academic fields. A positive value is for example represented with hot stimuli and a negative value with cold stimuli. The thermal stimulation can also be used to communicate emotions. Thus, it is possible to transmit different degrees of pleasure to the user of the system. For example, positive emotions are communicated to the user with hot stimuli and negative emotions with cold stimuli.

In addition to the use of means for emitting at least one flow rate-controlled air jet toward the stimulation zone, the system according to the invention can include means for spraying water toward the stimulation zone. For this, conventional devices for spraying water or water droplets can be used, such as an aerosol spray. This embodiment makes it possible to control the moisture level of the outlet air jet. The variation of moisture makes it possible to associate different levels of dampness (moisture) with the touch stimulus.

The invention claimed is:

1. A haptic system for establishing an interaction between at least one part of a body of a user, being stimulation zone, and a virtual environment, and comprising:
    means for estimating the position of the stimulation zone;
    means for emitting, toward the stimulation zone, at least one flow rate-controlled air jet, the air jet being emitted at a point of emission and its flow rate being determined as a function of the estimated position of the stimulation zone in space and of the characteristics of the virtual environment;
    a robotized structure controlled so as to move the point of emission of the air jet so that said point of emission remains at a constant distance from the stimulation zone, wherein the robotized structure is an articulated robotized arm.

2. The haptic system as claimed in claim 1, comprising means for modeling and displaying the virtual environment with which the user will interact.

3. The haptic system as claimed in claim 2, wherein the virtual environment corresponds to a modeling of a real environment with which the user interacts remotely.

4. The haptic system as claimed in claim 1, wherein the emission means comprise a device of mass flow rate controller type so as to control the flow rate of the air jet.

5. The haptic system as claimed in claim 1, wherein the emission means comprise a blowing nozzle, the point of emission of the air jet corresponding to the free end of said nozzle.

6. The haptic system as claimed in claim 5, wherein the blowing nozzle is fed by at least two sources of air of different temperatures, said flows being mixed so as to vary the temperature of the air jet at the outlet of the nozzle.

7. The haptic system as claimed in claim 1, in which the stimulation zone corresponds to the zone defined by the intermediate phalanges of the hand of the user.

8. The haptic system as claimed in claim 5, wherein the blowing nozzle has an angle of divergence of less than 12.5 degrees so as to obtain stimulate a small area of the stimulation zone.

9. The haptic system as claimed in claim 8, wherein the distance between the outlet of the blowing nozzle and the stimulation zone of the user is between ten and twenty centimeters.

10. The haptic system as claimed in claim 8, wherein the distance between the outlet of the blowing nozzle and the stimulation zone of the user is equal to fifteen centimeters.

11. The haptic system as claimed in claim 7, wherein the blowing nozzle has an angle of divergence of between 12.5 degrees and 22 degrees so as to stimulate an extended area of the stimulation zone.

12. The haptic system as claimed in claim 5, in which a flow rate controller is used so as to vary the flow rate of air feeding the blowing nozzle.

13. The system as claimed in claim 12, further comprising a flow rate sensor used so as to obtain an estimation of the emission flow rate at the inlet of the blowing nozzle.

14. The system as claimed in claim 13, wherein a regulation value is applied to the flow rate controller so as to obtain a flow rate at the outlet of the blowing nozzle close to a setpoint value Dcons when a difference between the estimated flow rate value and the setpoint Dcons is detected.

15. The system as claimed in claim 14 wherein the estimation of the flow rate at the inlet of the blowing nozzle is compared with a setpoint value Dcons using a digital electronic regulator.

16. The haptic system as claimed in claim 14, wherein the flow rate setpoint value Dcons is determined by using the following expression:

$$Dcons = F*k$$

in which:
   Dcons represents the flow rate setpoint expressed in liters per minute (L/min);
   F represents the modulus of the force to be applied to the stimulation zone, in newtons (N), this value being determined using the implementation of a model of interaction with the virtual environment;
   k is a constant expressed in L/min*N.

17. The haptic system as claimed in claim 1, comprising means for spraying water toward the stimulation zone so as to vary the level of humidity of said zone.

18. The system as claimed in claim 17, wherein the water spraying means are implemented using an aerosol spray.

\* \* \* \* \*